(12) United States Patent
Martin-Otto

(10) Patent No.: US 7,471,508 B2
(45) Date of Patent: Dec. 30, 2008

(54) SYSTEM AND METHOD FOR LOCKING COMPUTER

(75) Inventor: William Fred Martin-Otto, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 326 days.

(21) Appl. No.: 11/479,248

(22) Filed: Jul. 1, 2006

(65) Prior Publication Data
US 2008/0001507 A1    Jan. 3, 2008

(51) Int. Cl.
*H05K 5/00*    (2006.01)
*H05K 7/00*    (2006.01)

(52) U.S. Cl. .................... 361/683; 361/679; 361/681

(58) Field of Classification Search ............... 361/681, 361/683, 679
See application file for complete search history.

(56) References Cited

U.S. PATENT DOCUMENTS

| | | | | |
|---|---|---|---|---|
| 5,447,045 A * | 9/1995 | Cheng | | 70/58 |
| 5,531,082 A * | 7/1996 | Wolk et al. | | 70/63 |
| 5,709,110 A * | 1/1998 | Greenfield et al. | | 70/58 |
| 5,870,283 A | 2/1999 | Maeda et al. | | 361/686 |
| 5,928,017 A | 7/1999 | Lan | | 439/159 |
| 5,995,366 A | 11/1999 | Howell et al. | | 361/686 |
| 6,047,572 A * | 4/2000 | Bliven et al. | | 70/58 |
| 6,212,921 B1 * | 4/2001 | Knighton | | 70/58 |
| 6,275,378 B1 | 8/2001 | Lee et al. | | 361/686 |
| 6,714,408 B1 * | 3/2004 | Wang et al. | | 361/683 |
| 6,744,627 B2 | 6/2004 | Won et al. | | 361/686 |
| 6,757,166 B2 | 6/2004 | DeLuga et al. | | 361/686 |
| 7,028,513 B2 * | 4/2006 | Avganim | | 70/18 |
| 7,152,440 B1 * | 12/2006 | Austin | | 70/58 |
| 7,204,106 B2 * | 4/2007 | Merrem et al. | | 70/14 |
| 2003/0202323 A1 | 10/2003 | Maeda | | 361/686 |
| 2003/0227744 A1 | 12/2003 | DeLuga et al. | | 361/686 |

* cited by examiner

*Primary Examiner*—Jayprakash N Gandhi
*Assistant Examiner*—Anthony M Haughton
(74) *Attorney, Agent, or Firm*—John L. Rogitz

(57) ABSTRACT

A computer has a cover supporting a display and a base supporting a processor and hingedly coupled to the cover. A locking assembly includes a locking mechanism that is advanceable into a lock hole of the computer and that can be tethered to a stationary object to prevent theft of the computer. As the locking assembly is advanced into the hole, it moves a coupling that blocks the computer's cover latch mechanism from releasing the cover from a closed position against the base of the computer, thereby also locking the computer in the closed configuration.

17 Claims, 3 Drawing Sheets

SYSTEM AND METHOD FOR LOCKING COMPUTER

FIELD OF THE INVENTION

The present invention relates generally to locking computers.

BACKGROUND OF THE INVENTION

Owing to their portability, computers such as laptop and notebook computers can be easily stolen. Accordingly, physical locking mechanisms have been provided to secure a portable computer to another structure. The same considerations apply to desktop computers.

Even when fastened to a structure, however, the cover of the computer can be folded up and away from the base and data within the computer can be accessed by unauthorized users in the event that the owner leaves the computer unattended. Accordingly, mechanisms have been provided to lock the cover down against the base. As recognized herein, it would be advantageous from a convenience and cost standpoint to both fasten a computer to a structure and to lock the cover closed against the base using a single locking mechanism.

SUMMARY OF THE INVENTION

A computer such as a desktop or laptop or notebook computer has a cover defining a front edge and a rear edge and a base hingedly coupled to the cover along the rear edge. First and second latch arms are juxtaposed with the front edge and reciprocate generally parallel thereto. Each latch arm defines an interior end, and the interior ends face each other and define a space between them. Also, each latch arm defines a respective latch end that is configured for releasably engaging a respective receptacle to hold the cover in a closed configuration relative to the base. Each latch arm is releasable from its receptacle to permit the front edge of the cover to be pivoted up away from the base. A lock hole is formed in the computer in the cover and/or in the base at or near the read edge. In accordance with present principles, an elongated latch block bar extends perpendicularly to the front and rear edges and can be moved along its axis. The bar is biased to a first position, wherein a rear end of the latch block bar is closely juxtaposed with the lock hole and a front end of the latch block bar is not disposed in the space between the latch arms, such that movement of the latch arms is not impeded by the latch block bar. Moreover, the latch block bar can be moved to a second position by a locking mechanism that is advanced into the lock hole against the rear end of the latch block bar. In the second position, the front end of the latch block bar is disposed in the space between the latch arms to impede movement of the latch arms.

The latch arms may be supported on the cover. A spring may be engaged with the latch block bar to bias the latch block bar to the first position. In non-limiting embodiments a manipulable latch release button on the cover can be manipulated by a person to move the latch arms toward each other latch arm. When the latch block bar is in the second position and the latch arms are engaged with their respective receptacles to hold the cover in the closed configuration, owing to the latch block bar being in the second position, manipulation of the latch release button cannot cause sufficient movement of the latch arms to cause them to release from their respective receptacles.

In another aspect, in a computer having a cover supporting a display and a base supporting a processor and hingedly coupled to the cover along a hinge edge, a locking assembly is provided that includes a locking mechanism which is advanceable into a lock hole of the computer. The locking mechanism is manipulable by a user to prevent a portion of the mechanism from being withdrawn from the hole. The locking mechanism includes a tether attachable to an object other than the computer. The locking assembly further includes a latch mechanism that is operable to hold the cover closed against the base to substantially prevent viewing the display. The latch mechanism has a release configuration wherein the cover can be pivoted relative to the base to expose the display. A coupling mechanism is movable by the locking mechanism when the locking mechanism is advanced into the lock hole to prevent the latch mechanism from assuming the release configuration.

In still another aspect, a method for locking a computer having a latch mechanism to releasably hold the computer in a closed configuration is disclosed. The cover of the computer is hinged closed against a base, and the method includes advancing a locking mechanism with a tether into a hole of the computer to thereby prevent the latch mechanism from releasing the computer from the closed configuration.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
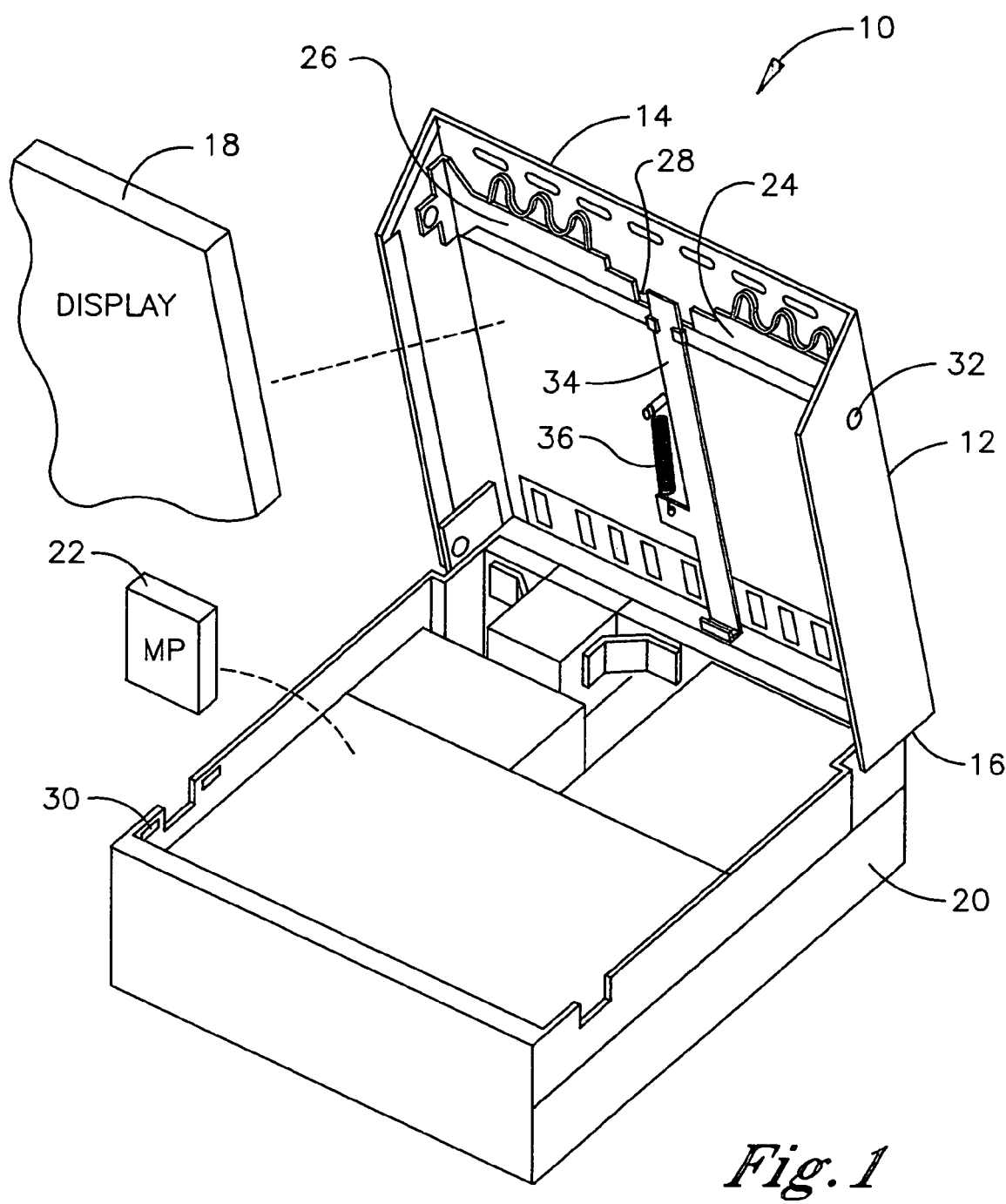
FIG. 1 is an exploded perspective view of a computer in the open configuration, schematically showing the display and processor, with portions broken away for clarity.

Referring initially to FIG. 1, a computer is shown, generally designated 10, that has a cover 12 defining a front edge 14 and a rear edge 16. In accordance with computer principles known in the art, a monitor or display 18 is supported by the cover 12. The computer 10 may be a desk top computer or laptop computer or notebook computer or other computer that functions as disclosed herein.

The computer 10 also has a base 20 that is hingedly coupled to the cover 12 along the rear edge 14 in accordance with principles known in the art. Thus, the computer 10 is a front-opening computer. Among other things, the base 20 can support a computer processor 22, a keyboard (not shown), a hard disk drive, etc.

In FIG. 1, the computer 10 is in an open configuration, in which the cover 12 is pivoted about the hinged connection along the rear edge 16 to raise the front edge 14 of the cover 12 up and away from the base 20. In the open configuration, the display 18 is exposed, as is the keyboard on the base 20. As is known in the computer art, the cover 12 can be folded down to a closed configuration onto the base 20 about the hinged connection at the rear edge 16, so that the front edge 14 of the cover 12 is closely juxtaposed with the base 20 and the display and keyboard are not exposed.

To hold the computer in the closed configuration, first and second latch arms 24, 26, typically supported on the cover 12, are juxtaposed with the front edge 14 for and reciprocating generally parallel to the front edge 14. Each latch arm 24, 26 defines a respective interior end, with the interior ends facing each other and defining a space 28 between them as shown. Also, opposite the interior ends the latch arms 24, 26 define respective latch ends that are configured for releasably engaging respective receptacles (only one receptacle 30 shown in the cut-away view of FIG. 1) in the base 20, to hold the cover in the closed configuration. A user can press one or more release buttons 32 to release the latch arms from their receptacles to permit the computer to be opened. In the embodiment shown, pressing the release button or buttons 32 moves the latch arms toward each other, i.e., moves the interior ends of the latch arms into the space 28.

In accordance with the present invention, an elongated axially rigid metal or plastic latch block bar 34 may be slidably supported on the cover 12 to extend substantially perpendicularly relative to the front and rear edges 14, 16. The latch block bar 34 is movable along its long axis and is biased to a first position (described further below in reference to FIG. 2), wherein a rear end of the latch block bar is closely juxtaposed with (and in fact can protrude slightly through) a lock hole in the computer 10. In the below-described first position, a front end of the latch block bar 34 is not disposed in the space 28 that is between the latch arms 24, 26, with movement of the latch arms to the release configuration consequently not being impeded by the latch block bar 34. The latch block bar 34 may be biased to the first position by a spring 36, one end of which is affixed to the cover 12 and the other end of which is connected to the latch block bar 34.

As described below in reference to FIG. 3, however, the latch block bar 34 is movable to a second position when a locking mechanism is advanced into the lock hole against the rear end of the latch block bar 34. In the second position, the front end of the latch block bar 34 is disposed in the space 28 that is between the latch arms 24, 26 to impede at least some movement of the latch arms.

Figure 2:
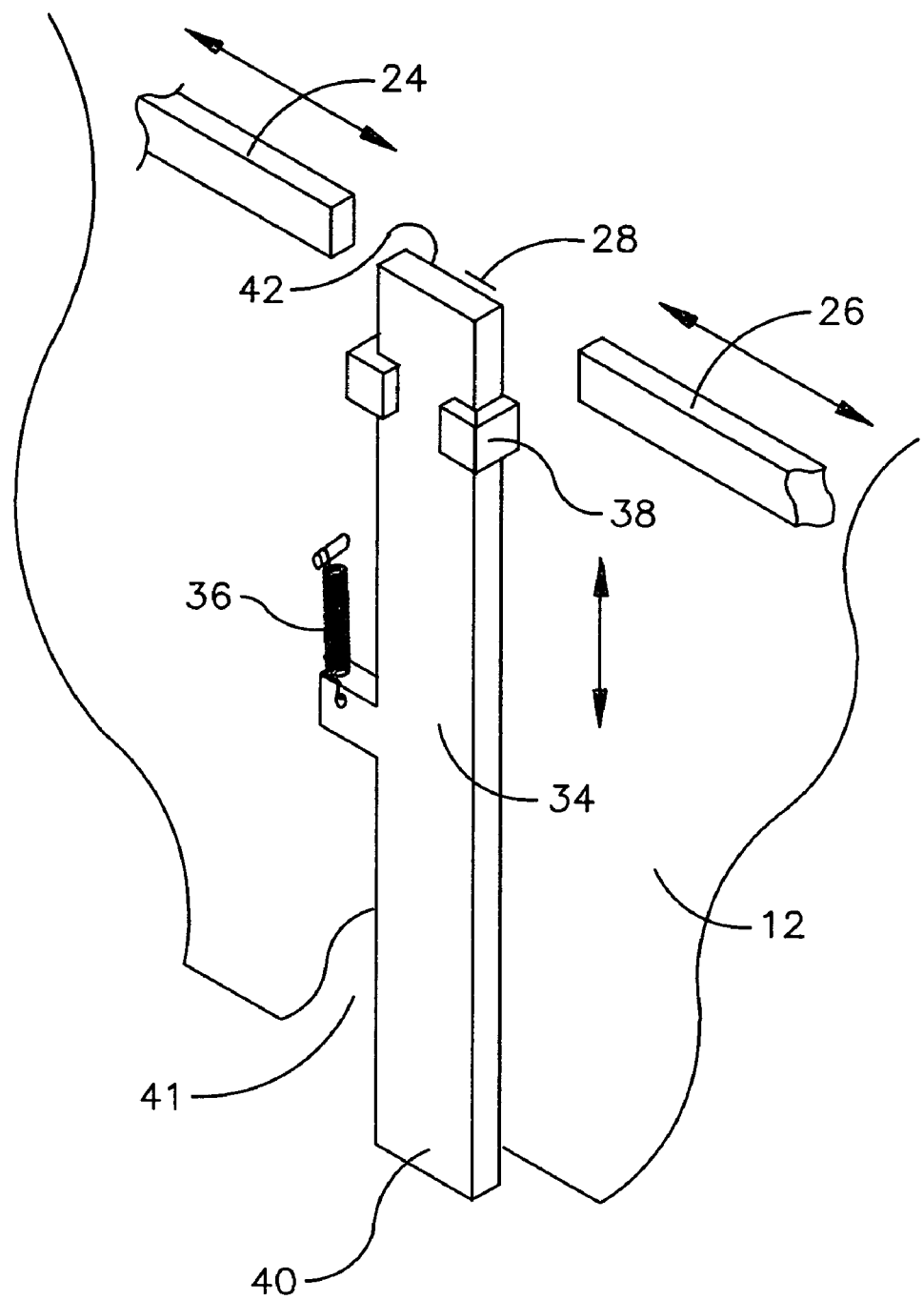
FIG. 2 is a perspective view of the latch block bar biased to the unlock position, with portions broken away.
Figure 3:
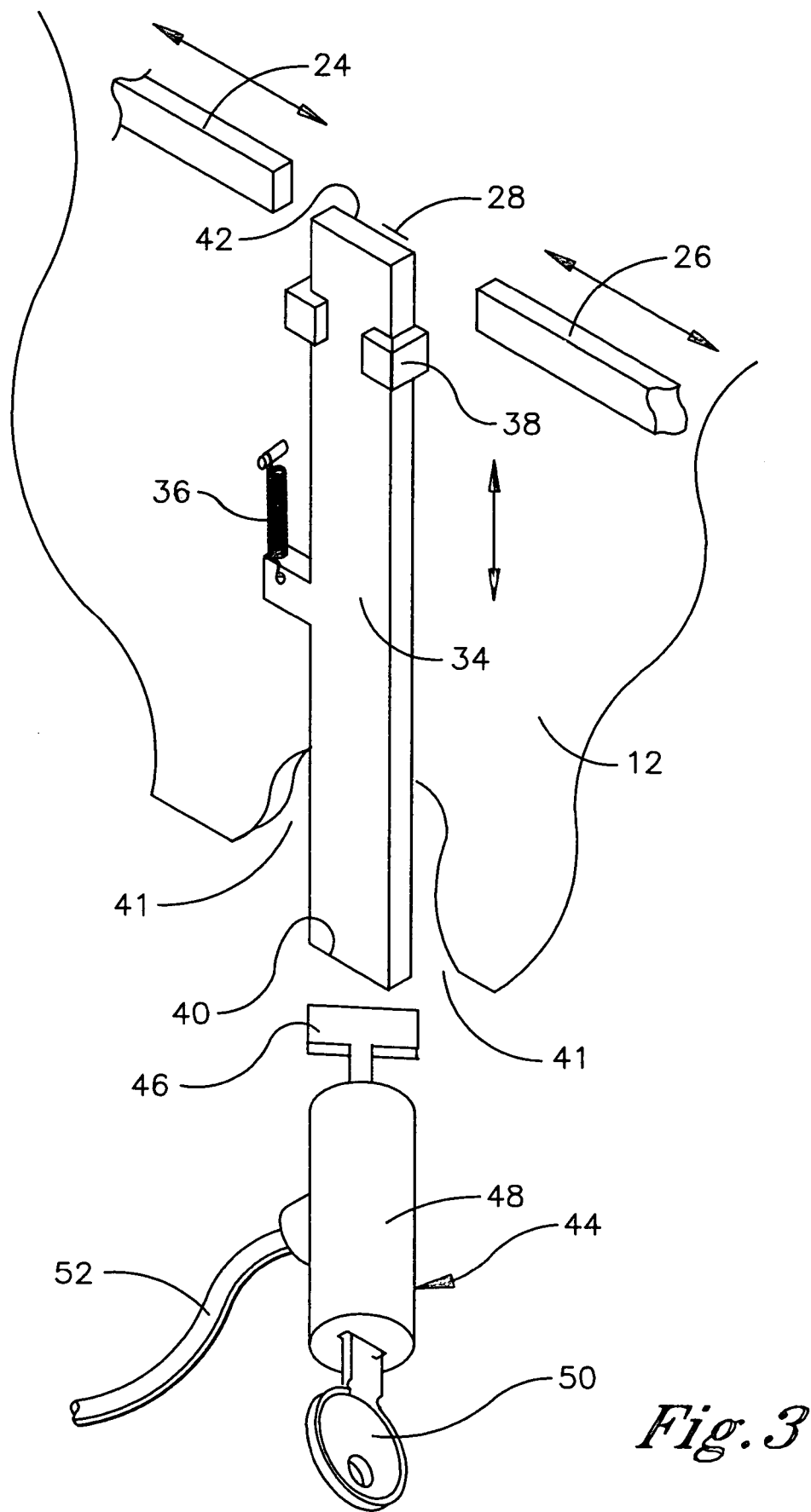
FIG. 3 is a perspective view of the latch block bar moved to the lock position by a tether locking mechanism, with portions broken away.

With more specificity, cross-reference is now made to FIGS. 2 and 3. The latch block 34 can be supported on the cover 12 by one or more sets of radial supports, such as L-shaped supports 38, that constrain lateral motion of the bar 34 and that permit free axial motion of the bar 34. In the biased, or first, position shown in FIG. 2, the rear end 40 of the latch block bar 34 is closely juxtaposed with (and in fact protrudes slightly through) a lock hole 41 that is formed in the computer 10, either in the cover 12 and/or in the base 20 at or near the read edge 16. The front end 42 of the latch block bar 34 is not disposed in the space 28 between the latch arms 24, 26 as shown when in the biased position, such that movement of the latch arms 24, 26 to the release configuration is not impeded.

As shown in FIG. 3, however, a locking mechanism 44 can be advanced into the hole 41, and when it is, the locking mechanism 44 abuts the rear end 40 of the bar 34 to push the bar 34 up so that the front end 42 is moved into the space 28 to impede movement of the latch arms 24, 26 when the user presses the release button or buttons 32 (FIG. 1). Accordingly, it will be appreciated that when the computer is closed with the latch arms engaged with the cover receptacles, a person can advance the locking mechanism into the hole 41 to lock the computer into the closed configuration.

In the non-limiting embodiment shown, the locking mechanism 44 is of the type that has a T-shaped lock end 46 mounted on a lock cylinder 48 and rotatable by means of a key 50 to cause the lock end 46 to turn in the hole 41. Typically, the hole 41 is elongated and the lock end 46 configured such that the "T" can fit through the hole 41 when the cross-bar portion of the "T" is parallel to the long dimension of the hole 41, but not when the cross-bar portion of the "T" is perpendicular to the long dimension of the hole 41. A cord-like tether 52 may extend from the cylinder 48 and be fastened to, e.g., a wall or heavy table or other object that is not easily movable. In this way, when the locking mechanism is locked in the hole 41 and tethered to another object, not only is the computer 10 safe from physical theft, but owing to the latch block bar 34 it can also be locked in the closed configuration to prevent data theft.

While the particular SYSTEM AND METHOD FOR LOCKING COMPUTER is herein shown and described in detail, it is to be understood that the subject matter which is encompassed by the present invention is limited only by the claims.

What is claimed is:

1. A computer comprising:

a cover defining a front edge and a rear edge;

a base hingedly coupled to the cover along the rear edge;

first and second latch arms juxtaposed with the front edge and reciprocating generally parallel thereto, each latch arm defining an interior end, the interior ends facing each other and defining a space therebetween, each latch arm defining a respective latch end configured for releasably engaging a respective receptacle to hold the cover in a closed configuration relative to the base, each latch arm being releasable from its receptacle to permit the front edge of the cover to be pivoted up away from the base;

a lock hole formed in the cover and/or in the base at or near the rear edge; and an elongated latch block bar extending substantially perpendicularly to the front and rear edges and being movable along the long axis defined by the latch block bar, the latch block bar being biased to a first position, wherein a front end of the latch block bar is not disposed in the space between the latch arms, such that movement of the latch arms is not impeded by the latch block bar, the latch block bar being movable to a second position by a locking mechanism advanced into the lock hole against a rear end of the latch block bar, wherein the front end of the latch block bar is disposed in the space between the latch arms to impede at least some movement of the latch arms.

2. The computer of claim 1, wherein the latch arms are supported on the cover, the cover supporting a computer display and the base supporting a digital processor.

3. The computer of claim 1, comprising a spring engaged with the latch block bar to bias the latch block bar to the first position.

4. The computer of claim 1, comprising at least one manipulable latch release button on the cover manipulable by a person to move at least one latch arm toward the other latch arm, wherein when the latch block bar is in the second position and the latch arms are engaged with their respective receptacles to hold the cover in the closed configuration, owing to the latch block bar being in the second position, manipulation of the latch release button cannot cause sufficient movement of the latch arms to cause them to release from their respective receptacles.

5. In a computer having a cover supporting a display and a base supporting a processor and hingedly coupled to the cover along a hinge edge, a locking assembly comprising:

at least one locking mechanism advanceable into a lock hole of the computer and manipulable by a user to prevent a portion of the mechanism from being withdrawn from the hole, the locking mechanism including a tether attachable to an object other than the computer;

a latch mechanism enclosed by the cover and base, and operable to hold the cover closed against the base to substantially prevent viewing the display, the latch mechanism having a release configuration wherein the cover can be pivoted relative to the base to expose the display; and a coupling mechanism movable by the locking mechanism when the locking mechanism is advanced into the lock hole to prevent the latch mechanism from assuming the release configuration without requiring the locking mechanism to be rotated in order to move the coupling mechanism and, thus, without requiring the locking mechanism to be rotated in order to prevent the latch mechanism from assuming the release configuration.

6. The assembly of claim 5, wherein the cover defines a front edge and the hinge edge is a rear edge, the latch mechanism comprising first and second latch arms juxtaposed with the front edge and reciprocating generally parallel thereto, each latch arm defining an interior end, the interior ends facing each other and defining a space therebetween, each latch arm defining a respective latch end configured for releasably engaging a respective receptacle to hold the cover in a closed configuration relative to the base, each latch arm being releasable from its receptacle to permit the front edge of the cover to be pivoted up away from the base.

7. The assembly of claim 6, wherein the lock hole is formed in the computer in the cover and/or in the base at or near the rear edge.

8. The assembly of claim 7, wherein the coupling mechanism comprises:

an elongated latch block bar extending substantially perpendicularly to the front and rear edges and being movable along the long axis defined by the latch block bar.

9. The assembly of claim 8, wherein the latch block bar is biased to a first position, wherein a rear end of the latch block bar is closely juxtaposed with the lock hole and a front end of the latch block bar is not disposed in the space between the latch arms, such that movement of the latch arms is not impeded by the latch block bar.

10. The assembly of claim 9, wherein the latch block bar is movable to a second position when the locking mechanism is advanced into the lock hole against the rear end of the latch block bar, the front end of the latch block bar being disposed in the space between the latch arms to impede at least some movement of the latch arms.

11. The assembly of claim 10, wherein the latch arms are supported on the cover.

12. The assembly of claim 11, comprising a spring engaged with the latch block bar to bias the latch block bar to the first position.

13. The assembly of claim 12, comprising at least one manipulable latch release button on the cover manipulable by a person to move at least one latch arm toward the other latch arm, wherein when the latch block bar is in the second position and the latch arms are engaged with their respective receptacles to hold the cover in the closed configuration, owing to the latch block bar being in the second position, manipulation of the latch release button cannot cause sufficient movement of the latch arms to cause them to release from their respective receptacles.

14. A method for locking a computer having a latch mechanism to releasably hold the computer in a closed configuration, wherein a cover of the computer is hinged closed against a base, comprising:

advancing a portion of locking mechanism having a tether into a hole of the computer to thereby prevent the latch mechanism from releasing the computer from the closed configuration, wherein the latch mechanism is operable to hold the cover closed against the base to substantially prevent viewing a display supported on the cover, the latch mechanism having a release configuration wherein the cover can be pivoted relative to the base to expose the display, wherein a coupling mechanism in the computer is movable by the locking mechanism when the locking mechanism is advanced into the lock hold to prevent the latch mechanism from assuming the release configuration, wherein the cover defines a front edge and the hinge edge is a rear edge, the latch mechanism comprising first and second latch arms juxtaposed with the front edge and reciprocating generally parallel thereto, each latch arm defining an interior end, the interior ends facing each other and defining a space therebetween, each latch arm defining a respective latch end configured for releasably engaging a respective receptacle to hold the cover in a closed configuration relative to the base, each latch arm being releasable from its receptacle to permit the front edge of the cover to be pivoted up away from the base.

15. The method of claim 14, wherein the coupling mechanism comprises:

an elongated latch block bar extending substantially perpendicularly to the front and rear edges and being movable along the long axis defined by the latch block bar.

16. The method of claim 15, wherein the latch block bar is biased to a first position, wherein a rear end of the latch block bar is closely juxtaposed with the lock hole and a front end of the latch block bar is not disposed in the space between the latch arms, such that movement of the latch arms is not impeded by the latch block bar.

17. The method of claim 16, wherein the latch block bar is movable to a second position when the locking mechanism is advanced into the lock hole against the rear end of the latch block bar, the front end of the latch block bar being disposed in the space between the latch arms to impede at least some movement of the latch arms.

* * * * *